United States Patent [19]

Tsuboi et al.

[11] Patent Number: 5,371,602
[45] Date of Patent: Dec. 6, 1994

[54] PICTURE DATA RECORDING/REPRODUCING SYSTEM FOR RECORDING COMPRESSED PICTURE DATA AND REPRODUCING RECORDED DATA WITH PLURAL REPRODUCTION MODES

[75] Inventors: Yukitoshi Tsuboi; Masahiro Yasuoka, both of Yokohama; Teiji Okamoto, Fujisawa, all of Japan

[73] Assignee: Hitachi, Ltd., Tokyo, Japan

[21] Appl. No.: 731,395

[22] Filed: Jul. 17, 1991

Related U.S. Application Data

[63] Continuation of Ser. No. 365,124, Jun. 12, 1989, abandoned.

[30] Foreign Application Priority Data

Jun. 13, 1988 [JP] Japan .................. 63-143721

[51] Int. Cl.$^5$ .......................................... H04N 5/76
[52] U.S. Cl. ...................... 358/335; 358/342; 360/33.1
[58] Field of Search .......... 358/335, 342, 343, 133, 358/134, 135, 310, 330; 360/19.1, 33.1, 32, 35.1; 370/124, 73, 69.1, 112; 328/154, 104, 105, 153; H04N 5/76

[56] References Cited

U.S. PATENT DOCUMENTS

| | | | |
|---|---|---|---|
| 4,308,563 | 10/1979 | Gohda et al. | 360/33.1 |
| 4,389,681 | 6/1983 | Tanaka et al. | 360/27 |
| 4,614,980 | 9/1986 | Ninomiya et al. | 358/335 |
| 4,785,349 | 11/1988 | Keith et al. | 358/133 |
| 4,789,894 | 12/1988 | Cooper | 358/335 |
| 4,887,169 | 12/1989 | Bannai et al. | 358/3 |
| 4,910,605 | 3/1990 | Sasaki et al. | 358/310 |
| 4,931,879 | 6/1990 | Koga et al. | 358/335 |
| 4,969,055 | 11/1990 | Oberjatzas et al. | 360/32 |

*Primary Examiner*—Tommy P. Chin
*Assistant Examiner*—Huy Nguyen
*Attorney, Agent, or Firm*—Antonelli, Terry, Stout & Kraus

[57] ABSTRACT

A moving picture data recording/reproducing system. In recording operation, moving picture data of a first frame row including frames selected from frames of an input picture signal for every predetermined number of frames are coded in accordance with an intra-frame coding method in which coding is completed within each frame, while picture data of a second frame row including the other frames are coded by an inter-frame coding method assuring a high compression ratio. The coded data resulting from the inter-frame coding and the intra-frame coding are multiplexed by interleaving them in the order of the frame numbers, the multiplexed data being then recorded on a recording medium. In reproducing operation, the multiplexed data are read out for reproducing the moving picture signal or alternatively the intra-frame coded data of the first frame row are selectively read out for reproducing the moving picture signal.

10 Claims, 12 Drawing Sheets

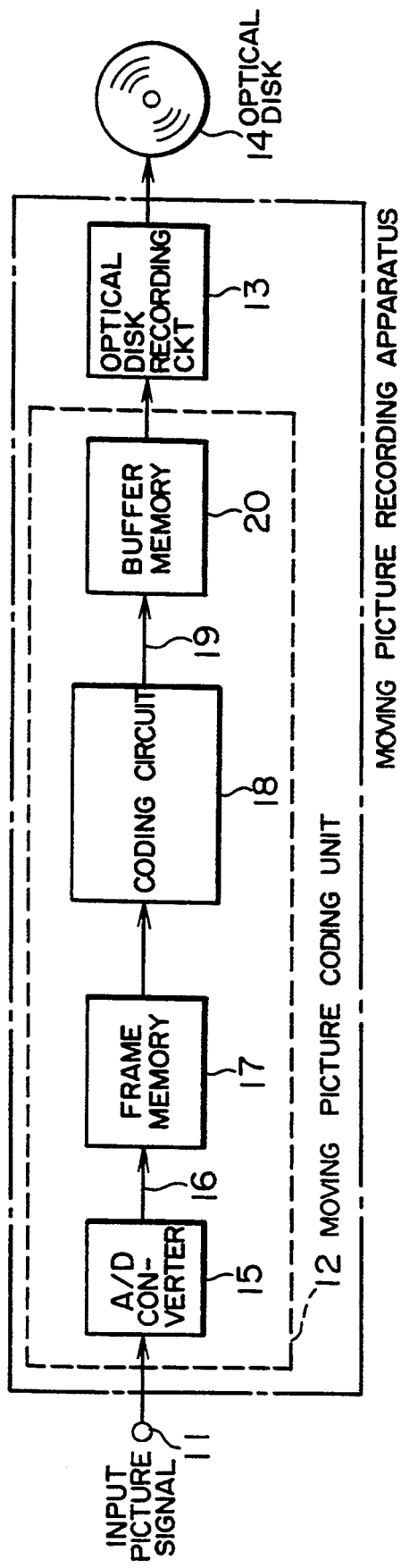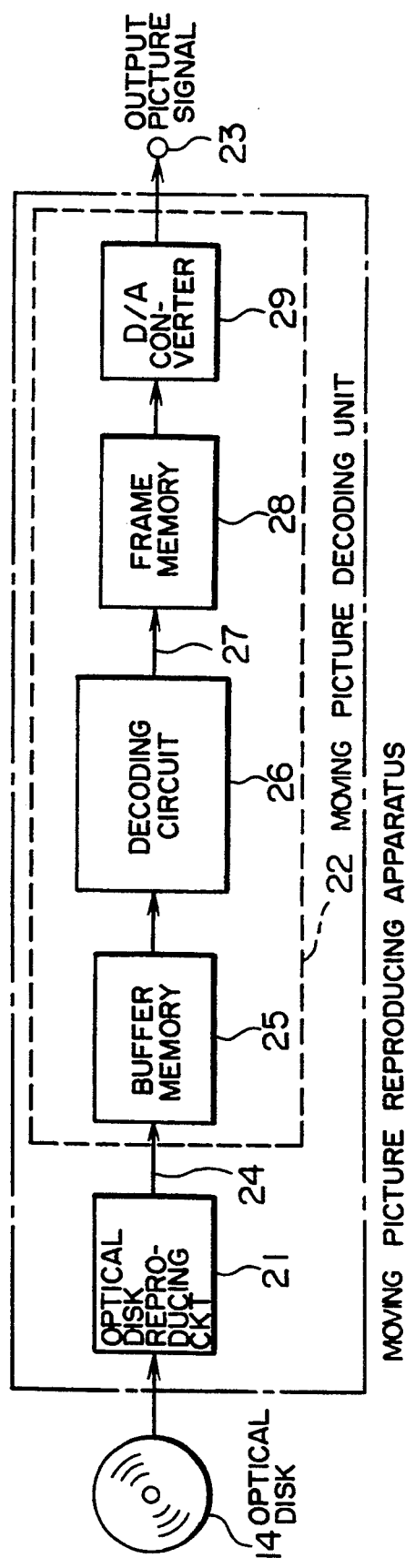

PROIR ART

PROIR ART

38 FRAME

NORMAL SPEED REPRODUCTION

TREBLE SPEED REPRODUCTION

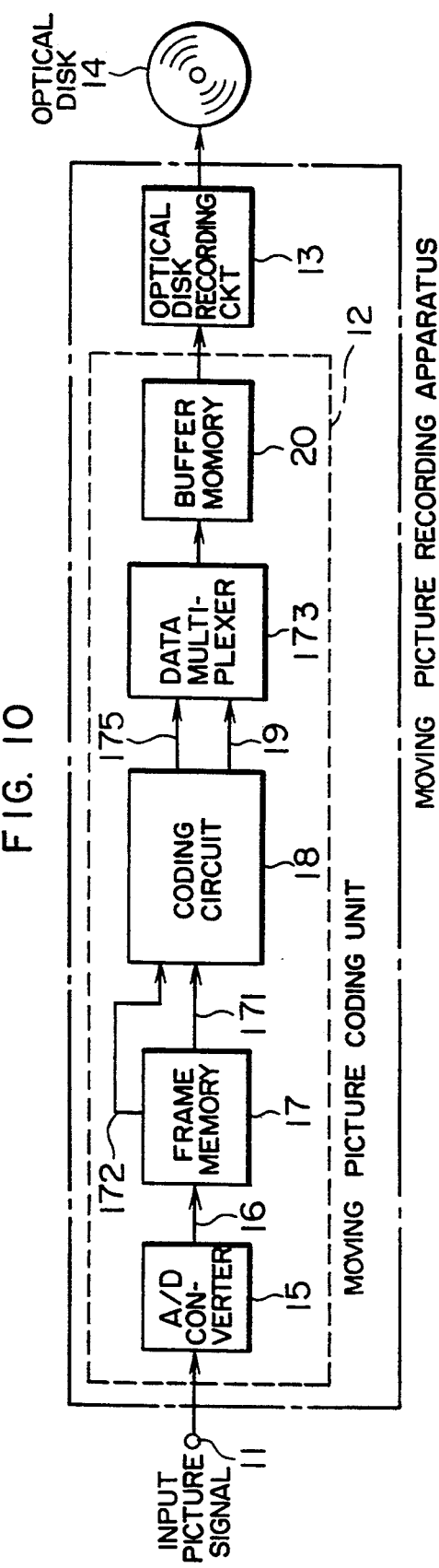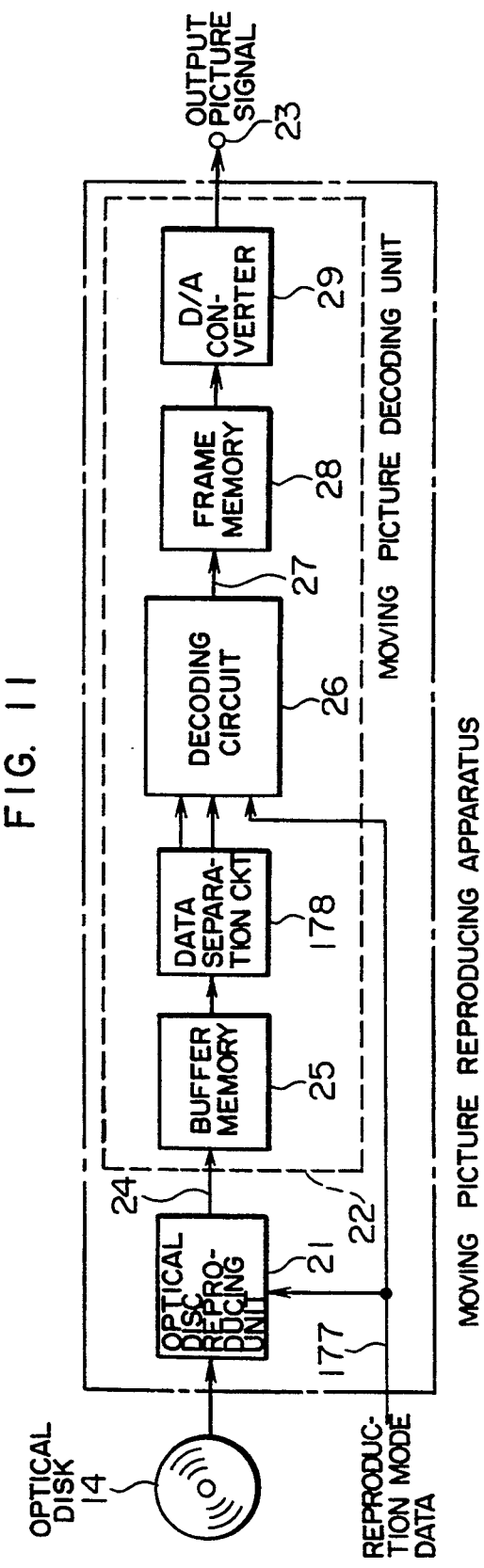

F I G. 12
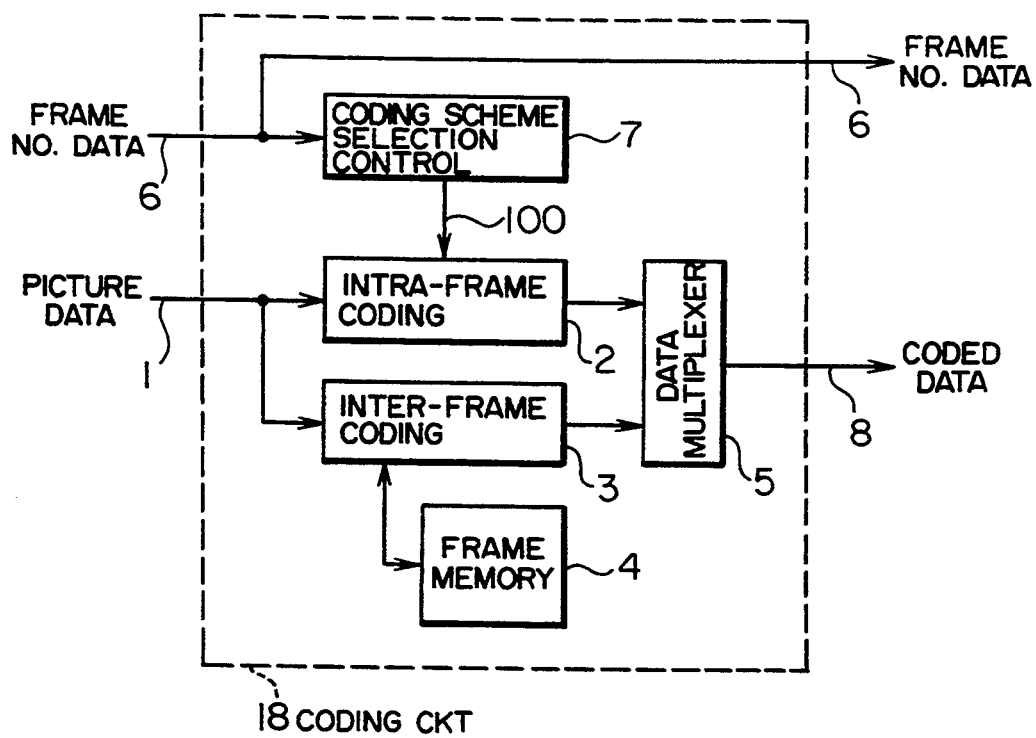
F I G. 13
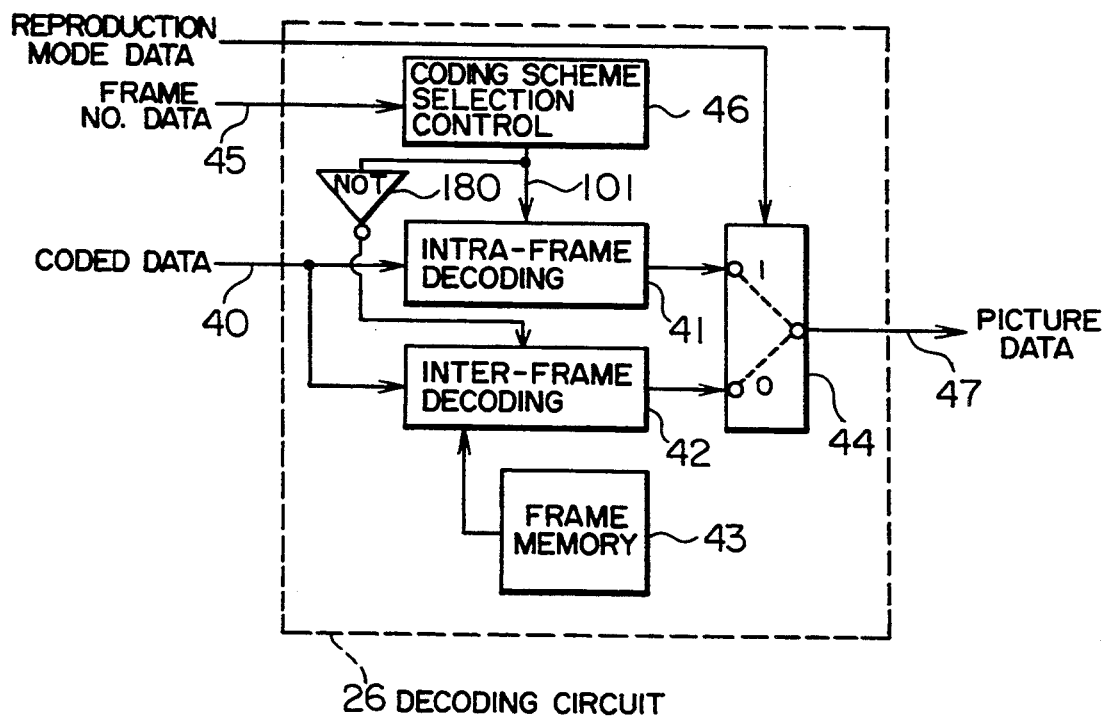

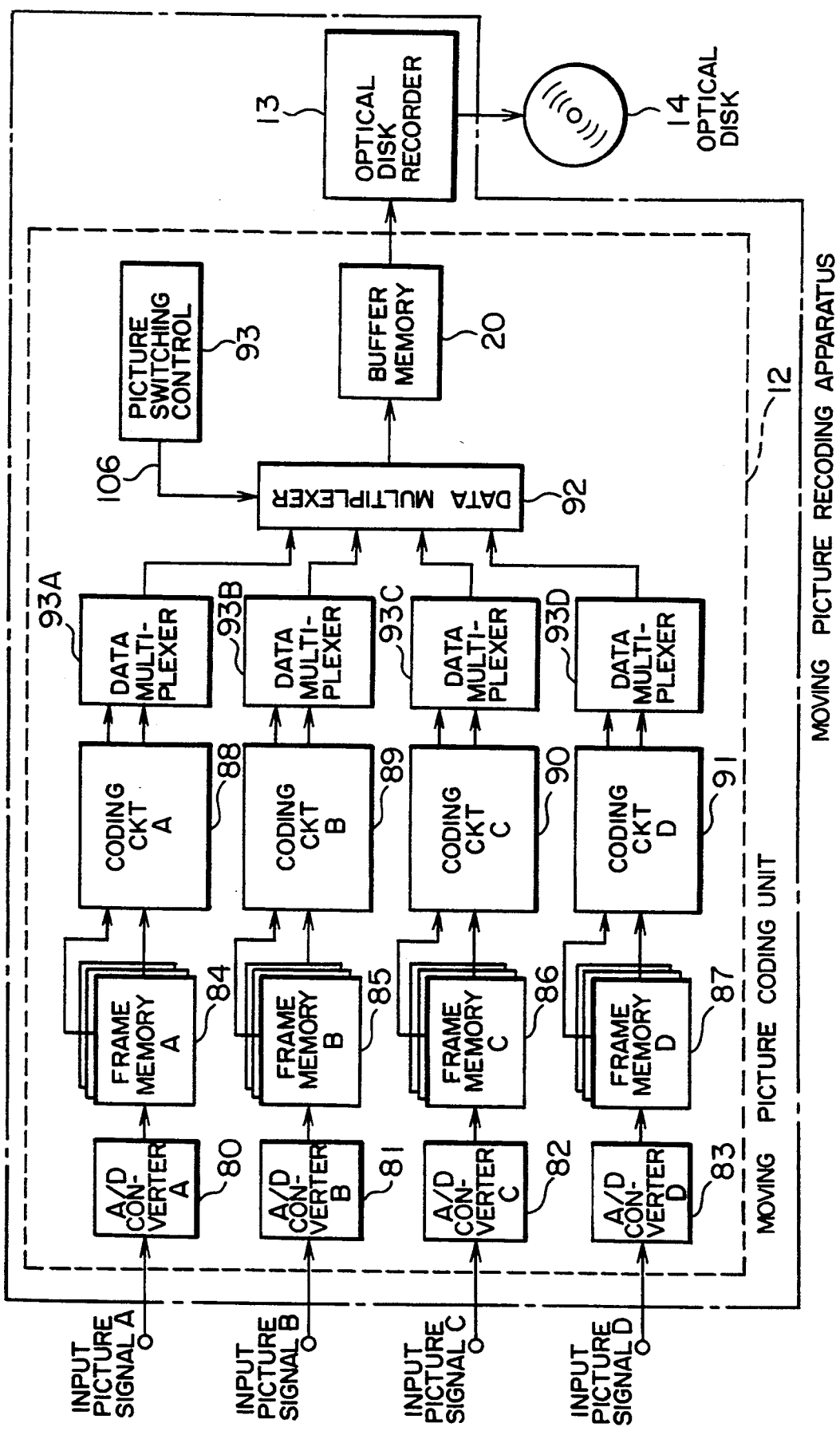

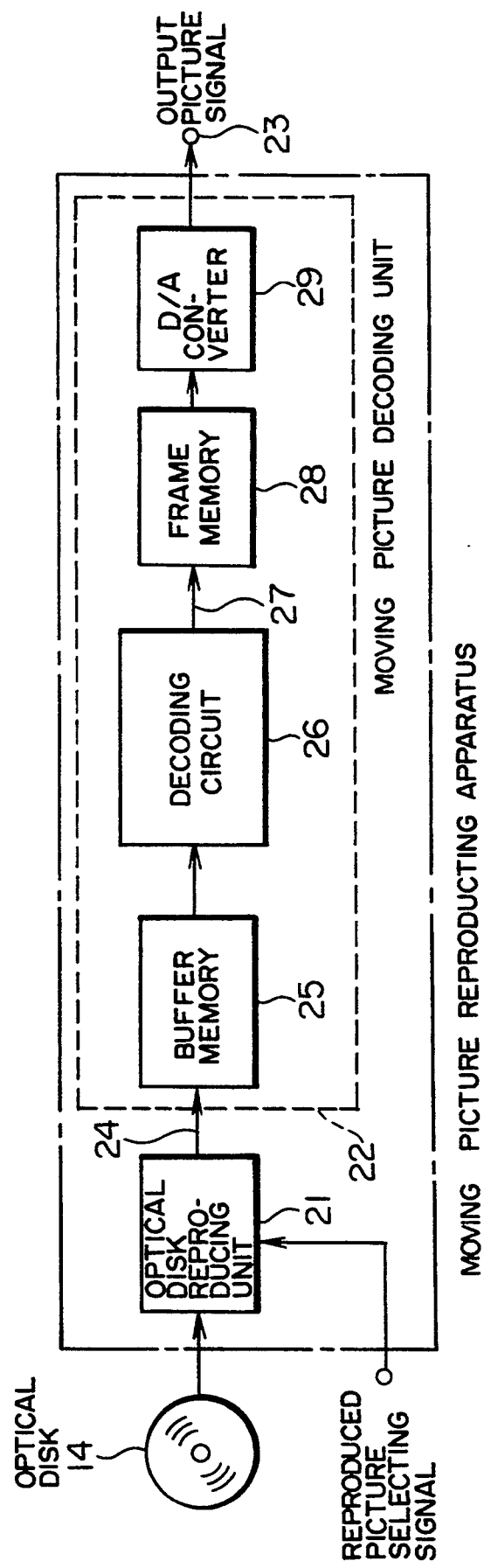

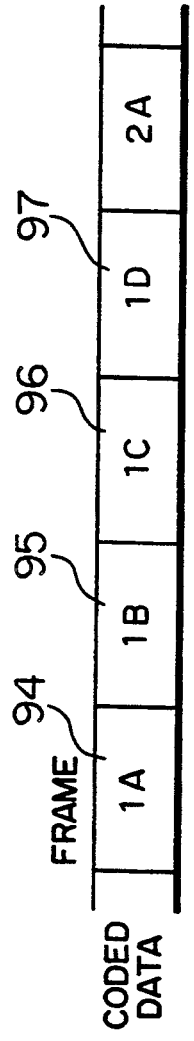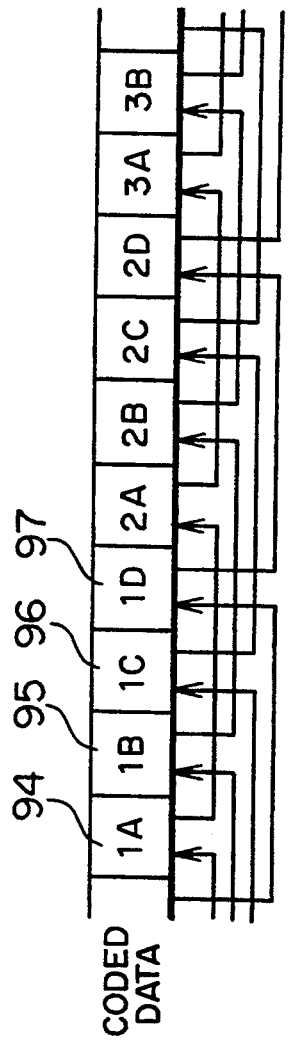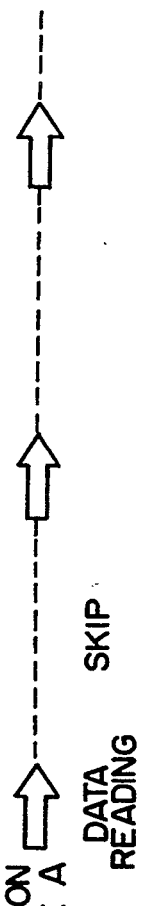
FIG. 22A
FIG. 22B
FIG. 23A
FIG. 23B

PICTURE DATA RECORDING/REPRODUCING SYSTEM FOR RECORDING COMPRESSED PICTURE DATA AND REPRODUCING RECORDED DATA WITH PLURAL REPRODUCTION MODES

This application is a continuation of application Ser. No. 365,124, filed Jun. 12, 1989, now abandoned.

BACKGROUND OF THE INVENTION

The present invention relates generally to a picture data recording/reproducing system. More particularly, the invention is concerned with a picture data recording/reproducing system which is capable of recording picture data at a high compression rate and reproducing the picture data selectively at a normal reproduction speed and a higher reproduction speed.

As a system for recording and reproducing dynamic picture (image) data known heretofore, there may be mentioned a system which is disclosed in JP-A-62-164391 and in which a picture coding transmission apparatus is employed.

FIGS. 1 and 2 of the accompanying drawings are block diagrams showing a general arrangement of a moving picture recording/reproducing system based on the picture data transfer scheme known heretofore. More specifically, FIG. 1 shows a moving picture recording apparatus designed for recording on an optical disc digitized moving picture data after compression thereof, and FIG. 2 shows a moving picture reproducing apparatus for decoding the picture data read out from the optical disk and expanding the data on a real time basis for thereby displaying the moving picture. In FIG. 1, a reference numeral 11 denotes an input terminal for a picture signal, 12 denotes generally a moving picture coding unit, 13 denotes an optical disc recording unit, and a numeral 14 denotes an optical disc storage. The moving picture recording apparatus is constituted by the moving picture coding unit 12 and the optical disc recording unit 13. On the other hand, the moving picture coding unit 12 is composed of an analogue-to-digital (A/D) converter 15, a frame memory 17, a picture coding circuit 18 and a buffer memory 20.

Referring to FIG. 2, a numeral 21 denotes an optical disk reading unit, 22 generally denotes a moving picture decoding unit, and 23 denotes an output terminal for the reproduced picture signal. The moving picture reproducing apparatus is constituted by the optical disc reproducing unit 21 and the moving picture decoding unit 22, which in turn is composed of a buffer memory 25, a picture decoding circuit 26, a frame memory 28 and a digital-to-analogue (D/A) converter 29, wherein a numeral 27 designates picture data.

In operation, the input picture signal applied to the input terminal 11 is supplied to the input of the moving picture coding unit 12, wherein the analogue picture signal is converted into digital picture data by the A/D converter circuit 15, which data is outputted onto a line 16 and thence supplied to the frame memory 17 to be stored therein. The picture coding circuit 18 encodes the picture data outputted from the frame memory 17 with high efficiency to thereby generate coded data which is then stored in the buffer memory 20 over a line 19. The coded data stored in the buffer memory 20 is then supplied to the optical disc recording unit 13, whereby the coded moving picture data transferred from the moving picture coding unit 12 is recorded on the optical disc 14. Of course, in the case of a read-only optical disk in which data can not be written by the user, such as a CD-ROM (Compact Disc—Read Only Memory) and others, a prototype is first prepared, from which replica discs are manufactured by press equipment.

Upon reproduction of the optical disc 14 having the coded moving picture data recorded thereon by the optical disc reading unit 21, the coded data read out from the optical disc 14 is supplied to the moving picture data decoding unit 22. More specifically, the coded picture data outputted on the line 24 is first stored in the buffer memory 25 and subsequently decoded by the picture data decoding circuit 26, whereby the decoded picture data is generated. The decoded picture data thus generated is supplied to the frame memory 28 over a line 27 to be stored and held therein. Subsequently, the decoded picture data is read out from the frame memory 28 and undergoes D/A conversion in the D/A converter circuit 29, the resultant analogue picture signal being then outputted as the output picture signal through the terminal 23.

With regard to the moving picture data coding scheme, there are known an intra-frame coding scheme and an inter-frame coding scheme, as is disclosed, for example, in JP-A-61-24577. According to the intra-frame coding scheme, the moving picture or picture data is coded completely in each of the data frames, as typified by a DPCM (Differential Pulse Code Modulation) according to which the difference between the current data value and the before or after data value is determined to be coded. On the other hand, according to the inter-frame coding scheme, the moving picture data is coded on a frame basis (i.e. frame by frame) by making use of frame information in the past, as exemplified by a changed-area coding scheme according to which the coding is performed only for the part of the data that has undergone a change from that of the preceding frame data. In general, the inter-frame coding scheme can assure a higher ratio of data compression than the intra-frame coding system, presenting the advantage that the amount of the coded data is correspondingly reduced.

FIG. 3 of the accompanying drawings shows in a block diagram an exemplary structure of the coding circuit 18 implemented on the basis of the DPCM principle, and FIG. 4 shows in a block diagram a structure of the decoding circuit 26 which is compatible with the DPCM coding circuit 18. Referring to FIG. 3, a reference numeral 30 denotes a data value subtraction circuit, 31 denotes a quantitizing circuit for quantitizing data with a decreased number of the quantitizing levels to thereby reduce further the amount of data to be processed, 32 denotes a representative value setting circuit, 35 denotes a data value addition circuit, and a numeral 34 denotes a data value hold circuit. The data value substraction circuit 30 serves for determining the difference between the value of the picture data 16 inputted currently thereto and the immediately preceding value of the picture data held in the data value hold circuit 34. The difference data thus derived is then quantitized by the quantitizing circuit 31 with the number of quantitizing levels being decreased to an appropriate value, whereby coded data is generated to be outputted onto the line 19. In the representative value setting circuit 32, the coded data undergoes a reverse quantitization for restoring the original bit number by adding "Os" in a number corresponding to the number of bits deleted by the quantitizing circuit 31 to be subsequently added to the value of the immediately preceding picture data by the data value addition circuit 33. In this manner, the picture data is, so to say, locally decoded through cooperation of the circuits 32 and 33. The picture data resulting from the local decoding mentioned above is stored and held in the data value hold circuit 34 to be thereby delayed by one picture element. Now, referring to FIG. 4, a numeral 35 denotes a representative value setting circuit, 36 denotes a data value addition circuit and 37 denotes a data value hold circuit. The coded data 24 undergoes a reverse quantitization in the representative value setting circuit 35 and is subsequently added by the value addition circuit 36 to the value of the immediately preceding picture data stored and held in the data value hold circuit 37 to be thereby decoded. The picture data generated on the line 27 as a result of the decoding is stored and held in the data value hold circuit 37 to be delayed by one picture element.

FIG. 5 is a schematic diagram for illustrating conceptually a changed-area coding scheme exemplifying typically the inter-frame coding scheme. In a frame generally designated by 38 in this figure, pictures depicted in a solid line belong to the frame being generated currently, while pictures depicted in broken lines are those of the immediately preceding frame. According to the changed-area coding system, only the regions 39 each indicated as enclosed by a thick solid line need to be coded, which means that a high ratio of compression can be accomplished. For coding the picture data within the changed areas or regions, there can be employed, for example, the DPCM intra-frame coding system. In this case, it is however noted that the frame memories for holding the picture data of the immediately preceding frame must be provided in association with the coding circuit 18 and the decoding circuit 26, respectively, because the data of the immediately preceding frame has to be made use of upon coding and decoding, respectively.

Next, referring to FIGS. 6A to 6C, discussion will be made concerning a recording format for the coded moving picture data and a reproducing method adopted in the prior art dynamic picture reproducing/recording apparatus described hereinbefore in conjunction with FIGS. 1 and 2. FIG. 6A illustrates disposition or array of the coded moving picture data recorded on a track of the optical disk 14, and FIGS. 6B and 6C are views for illustrating a method of reproducing the coded data. As will be seen in FIG. 6A, the coded picture data is recorded on a frame basis in the order of the frame numbers assigned sequentially to a series of frames 58. The data compression is so realized that the amount of coded data for one frame becomes smaller than the maximum amount of the data which can be transferred within a period taken for displaying one frame (1/30 sec.) and which is determined on the basis of the maximum data transfer rate in the data reproduction from the optical disc. Upon reproduction of the moving picture data at an ordinary or normal speed, the coded data is read out on a frame basis in the order of the frame numbers, as shown in FIG. 6B. On the other hand, upon reproduction of the moving picture data at a high speed, e.g. at a trebled speed, the coded data is read out every third frame, as shown in FIG. 6C. It should further be added that in case the inter-frame coding scheme is adopted, the high speed reproduction based on the frame thinning-out or skipping mentioned above can not be realized.

When the intra-frame coding scheme is adopted, the high speed reproduction is certainly possible, because the picture data can be coded completely and independently within each frame. However, a difficulty will be encountered in an attempt to perform a recording for an extended time because of the impossibility of compressing the picture data at a relatively high ratio. On the other hand, when the inter-frame coding scheme is adopted, the picture data can certainly be compressed at a high compression ratio when compared with the case where the intra-frame coding is adopted, because the data compression is realized by making use of correlation of the picture data between the frames in the case of the inter-frame coding. However, because of the impossibility of coding the data independently within each frame according to the inter-frame coding, an attempt for high-speed reproduction of the picture data by reading out only the necessary frames is rendered impractical.

SUMMARY OF THE INVENTION

It is therefore an object of the present invention to overcome the shortcomings of the prior art technique described above and realize not only a normal-speed reproduction but also a high-speed reproduction and at the same time make it possible to record the dynamic picture data for an extended time period.

In view of the above object, there is provided according to an aspect of the present invention a picture data recording and reproducing system which is so arranged as to validate the intra-frame coding completed within each frame for the picture data of the frames to be extracted for the use thereof while the inter-frame coding ensuring a high ratio of data compression is adopted for the data of the other frames.

According to another aspect of the invention, it is proposed that for the frame to be extracted for use upon high-speed reproduction, the relevant picture data is coded by adopting a peculiar inter-frame coding scheme which makes use of the correlation between the frame of concern and the immediately preceding one in a row of frames as extracted. The peculiar inter-frame coding (hereinafter referred to as the interleave inter-frame coding) is completed within each frame row although not completed within each frame.

Thus, according to the present invention, the picture data is coded by validating the intra-frame coding or the interleave inter-frame coding for the frames required for the high-speed reproduction, while the picture data of the other frames are coded in accordance with the inter-frame coding method which can assure a high data compression ratio, whereby not only high-speed reproduction, but extended recording can be realized, to great advantage.

BRIEF DESCRIPTION OF THE DRAWINGS

FIG. 1 is a block diagram showing a structure of the prior art moving picture recording apparatus;

FIG. 2 is a block diagram showing a structure of the moving picture reproducing apparatus compatible with the recording apparatus shown in FIG. 1;

FIG. 10 is a block diagram showing schematically a structure of the moving picture data recording apparatus according to the first embodiment of the invention;

FIG. 11 is a block diagram showing a structure of the moving picture data reproducing apparatus compatible with the recording apparatus shown in FIG. 10;

FIG. 12 is a block diagram showing a picture data coding circuit according to a first embodiment of the present invention;

FIG. 13 is a block diagram showing a picture data decoding circuit compatible with the data coding circuit shown in FIG. 12;

FIG. 20 is a block diagram of a moving picture data coding circuit according to a fourth embodiment of the invention;

FIG. 21 is a block diagram showing a picture data decoding circuit compatible with the coding circuit shown in FIG. 20; and FIG. 22A, 22B and FIGS. 23A, 23B are diagrams illustrating conceptually the data recording and reproducing operations of the circuits shown in FIGS. 20 and 21, respectively.

DESCRIPTION OF THE PREFERRED EMBODIMENTS

In the following, the present invention will be described in detail in conjunction with examplary or preferred embodiments thereof by reference to the attached drawings.

In the first place, description will briefly be made concerning a structure of an optical disc employed for recording the coded moving picture data as well as a data format therefor employed in carrying out the invention. With the CD-ROM disc system, it is intended to record, on a compact disc (CD) of the same type used as that for audio applications, the computer data rather than digital audio data.

Figure 3:
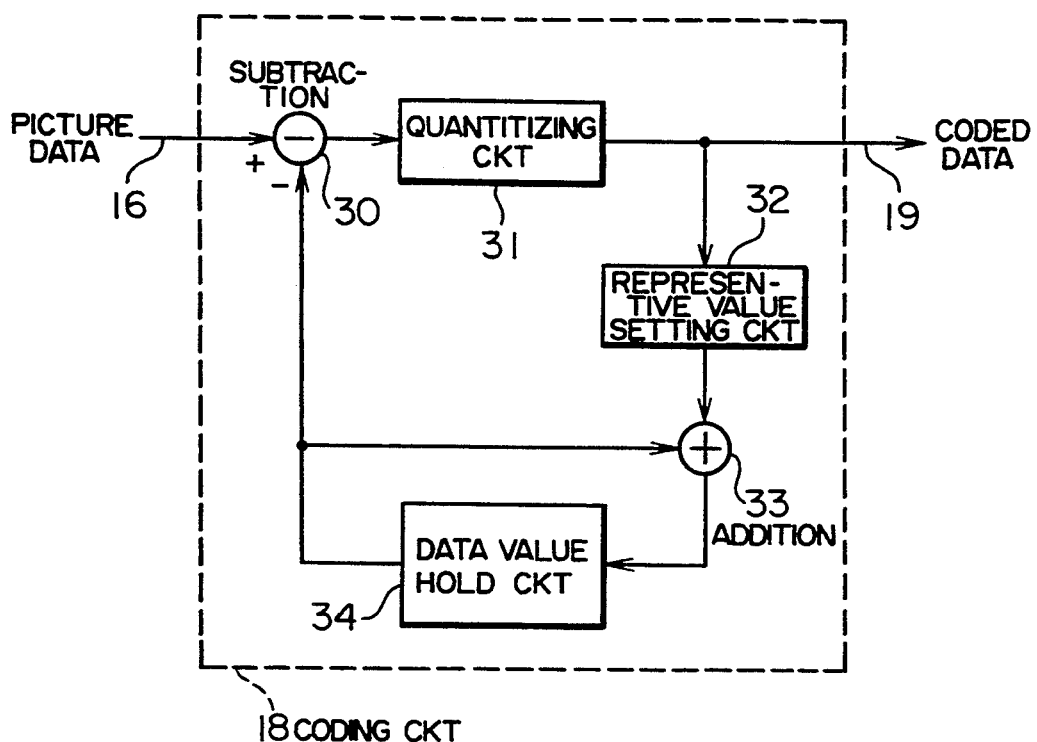
FIG. 3 is a block diagram showing an example of the intra-frame coding type picture data coding circuit.
Figure 4:
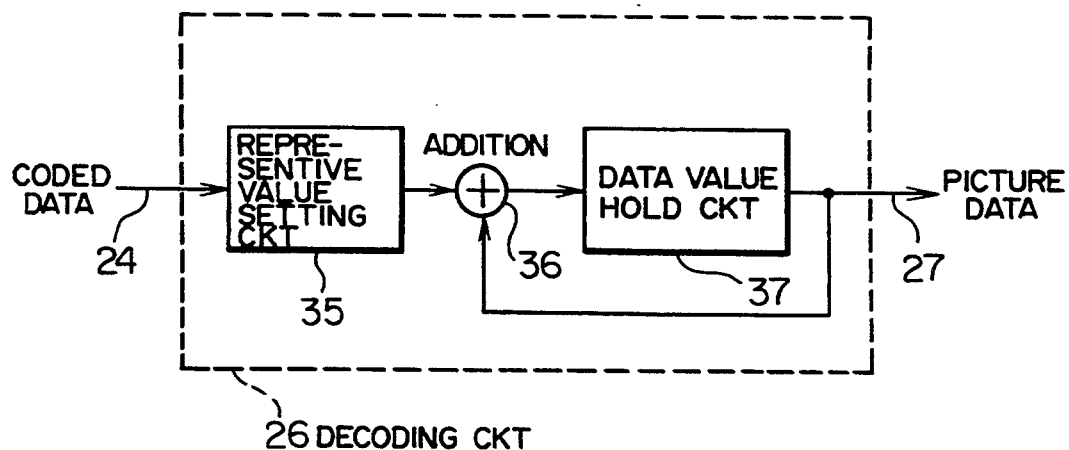
FIG. 4 is a block diagram showing a picture data decoding circuit compatible with the circuit shown in FIG. 3.
Figure 5:
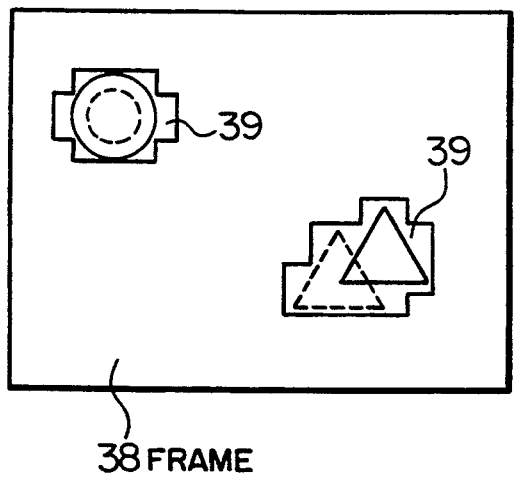
FIG. 5 is a diagram illustrating conceptually an example of the inter-frame coding.
Figure 6A:
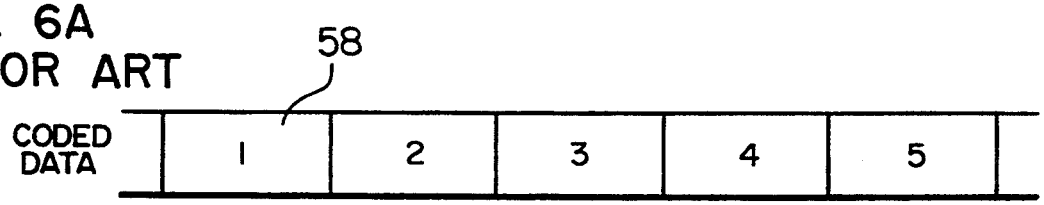
FIG. 6A to 6C are diagrams for illustrating the concept underlying the prior art picture data recording/reproducing system.
Figure 6B:
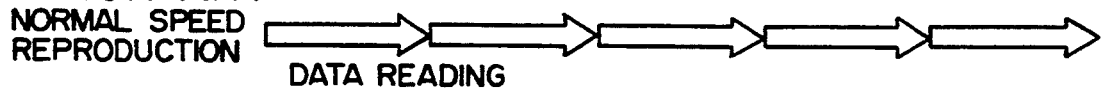
Figure 6C:
Figure 7:
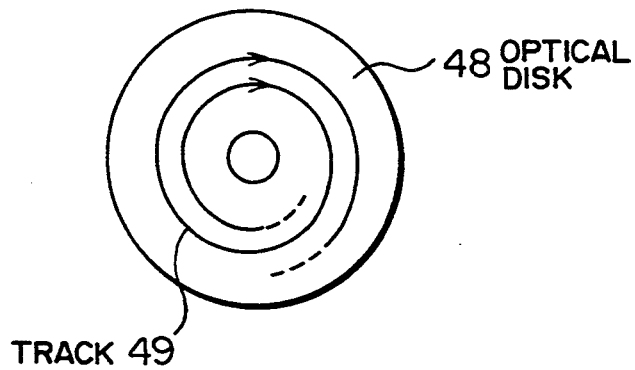
FIG. 7 is a diagram showing only conceptually a structure of a CD-ROM disc which is one species of the optical disc.
Figure 8:
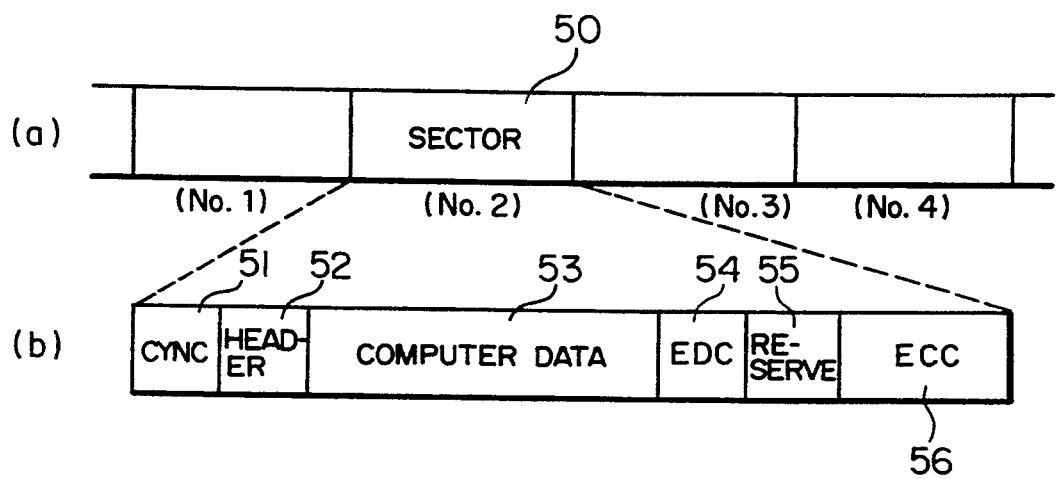
FIG. 8 is a diagram for illustrating conceptually a data format for the CD-ROM disc.

A structure of this optical disc is shown in FIG. 7. The disc 48 having a circular configuration is 12 cm in diameter and 1.2 mm thick, wherein a single continuous helical track 49 having a length of about 5000 m is formed on a disc surface. Formed sequentially along the track are a series of pits each having a width of 0.4 μm and a length in a range of 0.9 to 3.3 μm, which length varies in dependence on the value of data. A data format for the CD-ROM disc is illustrated in FIG. 8. A series of sectors 50 is recorded on the track 49, each sector consisting of 2352 bytes, as shown at (a) in FIG. 8. More specifically, each of the sectors 50 contains sync data 51 of 12 bytes (B) used for establishing synchronism, header data 52 of 4 bytes including address and mode information, blocked computer data 53 of 2048 bytes, an EDC (error detection code) 54 of 4 bytes based on 32-bit CRC (Cyclic Redundancy Check) code, a reserved area 55 of 8 bytes for future expansion and an ECC (Error Correction Code) 56 of 276 bytes based on Reed-Solomon code, as can be seen in FIG. 8 at (b).

Since the recording on the CD-ROM disc is attended by error correction with the aid of the EDC 54 and the ECC 56 in addition to the error correction for the audio CD, the ratio of error which the computer data may suffer can be compressed to a very low value. Further, because the data transfer rate is 1.2 Mbps (i.e. about 150 kB/sec), one disc is capable of recording computer data of about 540 MB. By virtue of the capability of recording a great amount of data as mentioned above and due to the high data transfer rate during reproduction, the CD-ROM optical disc can be advantageously used in a moving picture recording/reproducing system for recording and reproducing coded moving picture data.

Figure 9A:
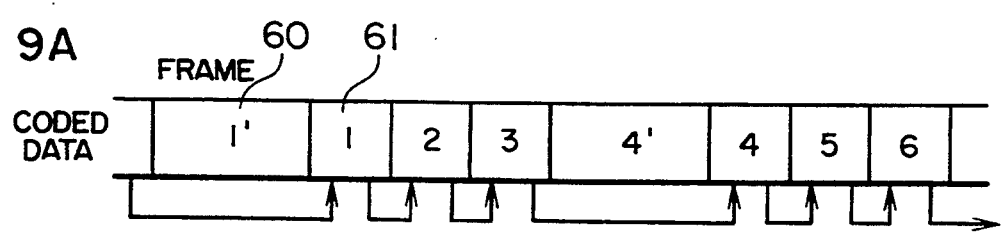
FIG. 9A to 9C are diagrams for illustrating the concept underlying a moving picture data recording/reproducing system according to a first embodiment of the present invention.
Figure 9B:
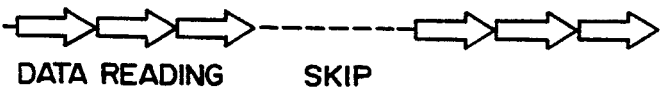
Figure 9C:

FIGS. 9A to 9C are views illustrating, by way of example, a format for recording the coded moving picture data and a method of reproducing data on the assumption that the optical disc 48 mentioned above is employed in carrying out the present invention. More specifically, FIG. 9A shows the disposition or array of the coded moving picture data recorded on the track 49 of the optical disc 48, and FIGS. 9B and 9C are views illustrating a method of reproducing the coded data. As can be seen in FIG. 9A, the coded data of the individual frames 61, compressed significantly as a result of the inter-frame coding, are recorded in the order of the frame numbers along with the intra-frame coded data of the frames 60 recorded every third frame. Upon reproduction at the normal speed, the inter-frame coded data of the frame 61 is read out frame by frame (i.e. on the frame basis) in the order of the frame numbers, as shown in FIG. 9B. On the other hand, in the case of reproduction at the trebled speed, the data of the frames 60, coded by the interleave intra-frame coding method, are sequentially read out. In this manner, both the normal speed reproduction and the trebled speed reproduction can be selectively realized.

FIGS. 10 and 11 show a picture data recording apparatus and a reproducing apparatus according to the invention which correspond to those shown in FIG. 1 and FIG. 2, respectively. In FIGS. 10 and 11, parts corresponding to those shown in FIGS. 1 and 2 are denoted by the same reference symbols, and the following description is directed only to those parts which are newly added.

Referring to FIG. 10, the frame memory 17 outputs onto lines 171 and 172 picture data stored therein together with the corresponding frame numbers thereof. The frame number data on the line 172 is transmitted through the picture data coding circuit 18 onto a line 175. A data multiplexer circuit 173 adds the frame number data on the line 175 to the coded data of each corresponding frame outputted from the picture data coding circuit 18 onto the line 19, the resultant data being then stored in the buffer memory 20.

On the other hand, in the reproducing apparatus shown in FIG. 11, reproduction mode data assuming a value of "0" or "1" in dependence on whether the normal speed reproduction or the high speed reproduction is selected is inputted to a line 177. The optical disk reading circuit 21 is operated either in the normal speed reproduction mode or in the; high speed reproduction mode in response to the reproduction mode data. A data separating circuit 178 separates the reproduced data into coded picture data and frame number data. The picture data decoding circuit 26 reproduces the picture data on the basis of the coded picture data and the frame number data supplied from the data separation circuit 178 and the reproduction mode data.

FIG. 12 is a block diagram showing in detail a circuit configuration of the picture data coding circuit according to an embodiment of the present invention employed in the moving picture data recording apparatus described above, and FIG. 13 is a block diagram showing in detail the structure of the picture data decoding circuit employed in the dynamic picture reproducing apparatus according to the invention. The picture data coding circuit shown in FIG. 12 corresponds to the circuit 18 shown in FIG. 10, while the picture data decoding circuit shown in FIG. 13 corresponds to the circuit 26 shown in FIG. 11. Now, referring to FIG. 12, a reference numeral 1 denotes an input line for the picture data, 2 denotes an intra-frame coding circuit, 3 denotes an inter-frame coding circuit, 4 denotes a frame memory, 5 denotes a data multiplexing circuit, 6 denotes a frame number data transfer line, 7 denotes a coding scheme selection control circuit, and numeral 8 denotes a coded data transfer line. In FIG. 13, reference numeral 40 denotes a coded data transfer (input) line, 41 denotes an intra-frame decoding circuit, 42 denotes an inter-frame decoding circuit, 43 denotes a frame memory, 44 denotes a data switching circuit, 45 denotes a transfer path line for the frame number data, 46 denotes a decoding scheme selection control circuit and numeral 47 denotes a transfer path for the picture data resulting from the decoding.

In the picture data coding circuit shown in FIG. 12, the frame number data on the line 6 represents the numbers sequentially assigned to the individual frames. The coding scheme selection control circuit 7 may be constituted in such a way that the frame number data is divided by "3" when the treble speed reproduction mode is to be established, to thereby output "1" on the line 100 when the frame number is divisible, while outputting "0" when it is indivisible. The coded data is generated from the input picture data through the process described below. All the picture data inputted from the line 1 is subjected to processing in the inter-frame coding circuit 3, while in the intra-frame coding circuit 2 only the picture data of the frames having frame numbers divisible by "3" are coded in response to the coding enable signal which appears on the line 100. A frame memory 4 for storing the data of the immediately preceding frame is provided in association with the inter-frame coding circuit 3. In the data multiplexing circuit 5, the coded data of all the frames outputted from the inter-frame coding circuit 3 and the coded data only of the specific frames outputted from the intra-frame coding circuit 2 are changed over to be outputted.

The picture data decoding circuit shown in FIG. 13 serves to generate the original picture data from the coded picture data. To this end, the decoding enable signal is generated by the decoding scheme selection control circuit 46 in such a manner that the decoding enable signal assumes a level "1" whenever the frame number data is divisible by "3", while it otherwise assumes the level "0", when the treble speed reproduction mode is set. In FIG. 13, numeral 180 denotes a NOT gate. Thus, in the intra-frame decoding circuit 41, only the coded data of the specific frames mentioned above is decoded in dependence on the decode enabling signal on the line 101, while in the inter-frame decoding circuit 42, the coded data of the other frames is decoded. A frame memory 43 is provided in association with the inter-frame decoding circuit 42 for storing the picture data of the immediately preceding frame. The picture data of all the frames outputted from the inter-frame decoding circuit 42 and the picture data only of the specific frames outputted from the intra-frame decoding circuit 41 are inputted to the data switch circuit 44, whereby only one of both the input picture data is outputted. The data switch circuit 44 is so interlocked with the mode change-over operation between the normal speed reproduction mode and the treble speed reproduction mode that the circuit 44 assumes the position or state "0" in the normal speed reproduction mode, while assuming the state "1" in the treble speed reproduction mode, wherein the switch circuit 44 is connected to the intra-frame decoding circuit 41 in the state "1" while being connected to the inter-frame coding circuit 42 in the state "0".

By adopting the coded data recording and reproducing systems described above, recording for an extended period with a high compression ratio can be implemented and at the same time not only normal speed reproduction, but also high speed reproduction can be carried out selectively.

Figure 14:
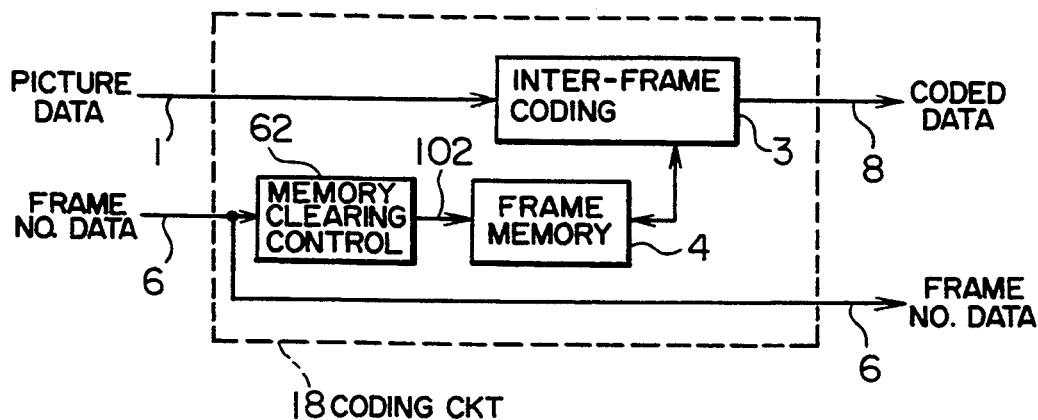
FIG. 14 is a block diagram showing a picture data coding circuit according to a second embodiment of the present invention.
Figure 15:
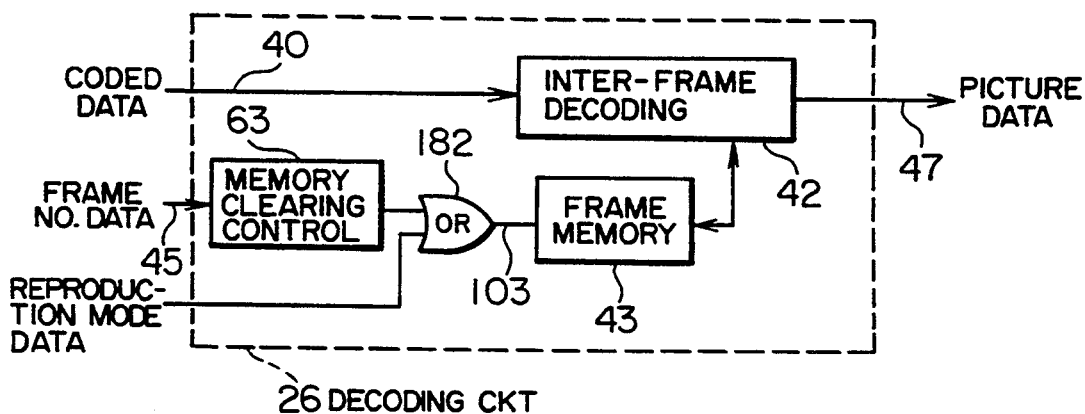
FIG. 15 is a block diagram showing a picture data decoding circuit compatible with the picture data coding circuit shown in FIG. 14.
Figure 16A:
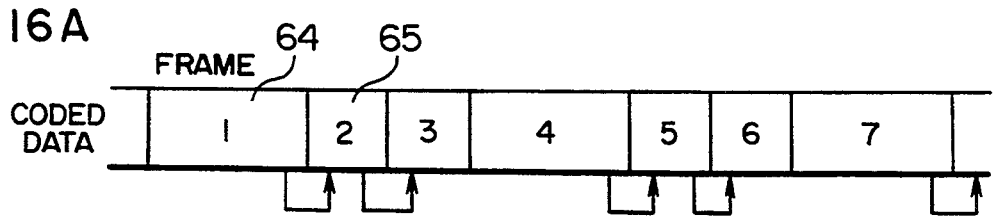
FIGS. 16A to 16C are diagrams for illustrating the principle underlying the moving picture data recording and reproduction performed by the circuits shown in FIGS. 14 and 15.
Figure 16B:
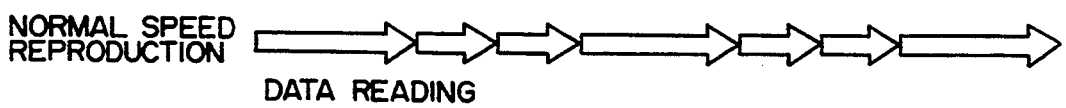
Figure 16C:
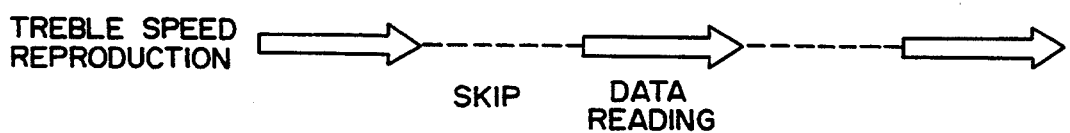

Next, a second embodiment of the present invention will be described by referring to FIGS. 14 and 15, in which FIG. 14 is a block diagram showing a picture data coding circuit incorporated in the moving picture data recording apparatus and FIG. 15 is a block diagram showing a picture data decoding circuit incorporated in the moving picture reproducing apparatus. Reference numerals 62 and 63 in FIGS. 14 and 15 denote memory clearing control circuits, respectively. In FIGS. 14 and 15, like parts as those shown in FIGS. 12 and 13 are denoted by the same reference numerals. Further, FIGS. 16A to 16C are views for illustrating a recording format for the coded moving picture data and a reproducing method. More specifically, FIG. 16A shows the disposition or array of the coded picture data recorded on the optical disc, and FIGS. 16B and 16C illustrate methods of reproducing the decoded data. It will be seen that the coded data of the individual frames resulting from the inter-frame coding and data compression are sequentially recorded in the order of the frame numbers. It should however be noted that for the specific frames 64 located, for example, every third frame, the same data as that resulting from the intra-frame data coding is recorded by clearing the frame memory 43 which serves to hold the data of the immediately preceding frame, while for the other frames, the data resulting from the inter-frame coding is recorded. When reproduction is to be performed at the normal speed, the coded data of all the frames 64 and 65 is sequentially read out frame by frame in the order of the frame numbers, as shown in FIG. 16B. On the other hand, upon reproduction at the treble speed, the intra-frame coded data of the frames 64 disposed every third frame is sequentially read out. In this way, both the normal speed reproduction and the treble speed reproduction can be realized selectively.

Now referring to FIG. 14, the picture data inputted to the picture data coding circuit over the line 1 is coded by the inter-frame coding circuit 3 to be outputted as coded picture data onto the line 8. However, since the content of the frame memory 4 is cleared in response to the memory clear signal on the line 102 upon intra-frame coding of the picture data for the specific frames, the same coded picture data as that resulting from the intra-frame coding are recorded for the specific frames. The memory clear signal is generated onto the line 102 by the memory clearing control circuit 62 for those frames having frame numbers divisible by "3" according to the frame numbers on the line 6 in the case of the illustrated embodiment. Thus, the memory clear signal is validated upon occurrence of every third frame. Referring to FIG. 15, the coded data inputted to the picture data decoding circuit from the line 40 is decoded by the inter-frame decoding circuit 42 to be outputted as picture data on the line 47. However, for specific frames, the input data is decoded according to the intra-frame decoding scheme, since in that case the content of the frame memory 43 is cleared in response to the memory clear signal appearing on the line 103. More specifically, the memory clear signal is generated by the memory clearing control circuit 63 on the line 45 for the frames having frame number data divisible by "3" and outputted through an OR gate 182 for logically ORing the memory clear signal and the reproduction mode data which assumes the value "0" in the normal speed reproduction mode. On the other hand, during the high speed reproduction, the reproduction mode data always assumes the value "1", resulting in the frame memory 43 being constantly cleared. Thus, only the intra-frame coded data is decoded by the decoding circuit 42.

By virtue of the arrangement of the coded data recording and reproducing systems described above, it is possible to realize a much extended recording period with a higher data compression ratio when compared with the system according to the first mentioned embodiment. Besides, not only normal speed reproduction, but also high speed reproduction can be realized. Further, when the specific frames which are coded according to the inter-frame data coding as shown in FIG. 16A are coded according to the intra-frame data coding between the specific frames, an even higher data compression ratio can be obtained.

Figure 17:
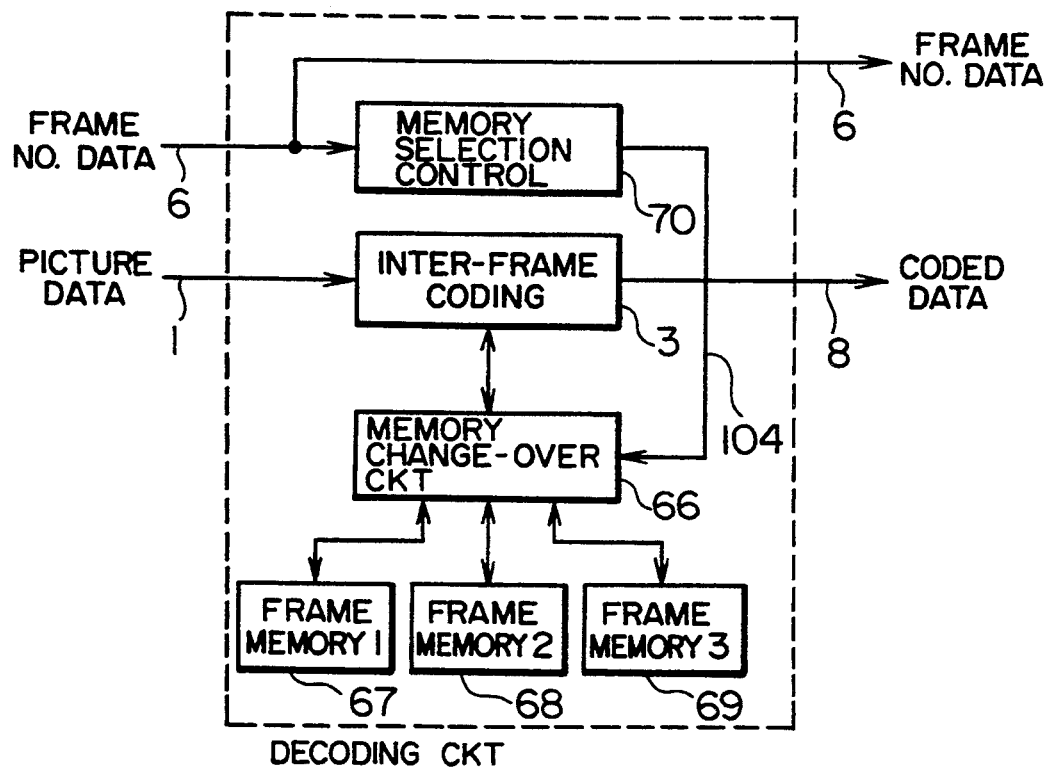
FIG. 17 is a block diagram showing the moving picture data coding circuit according to a third embodiment of the invention.
Figure 18:
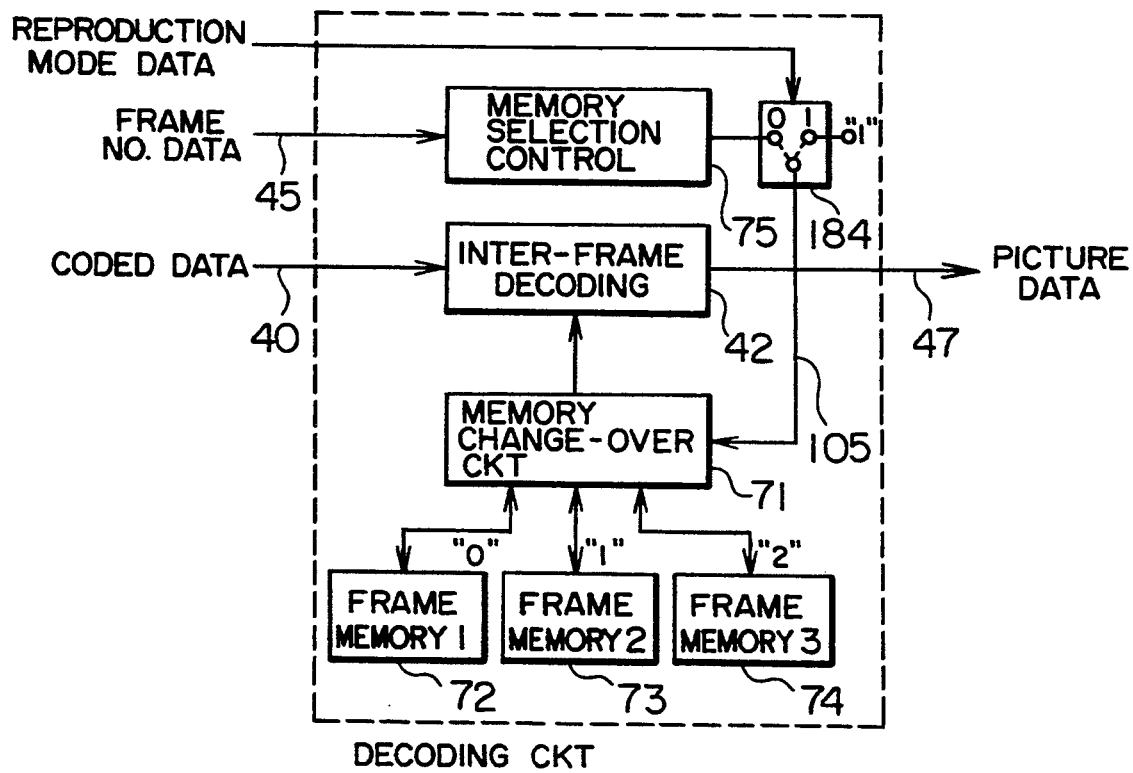
FIG. 18 is a block diagram showing a picture data decoding circuit compatible with the coding circuit shown in FIG. 17.

Now, this description will turn to a third embodiment of the invention by referring to FIGS. 17 and 18, in which FIG. 17 is a block diagram showing a picture data coding circuit incorporated in the moving picture recording apparatus according to the third embodiment of the invention and FIG. 18 is a block diagram showing a compatible picture data decoding circuit incorporated in the moving picture reproducing apparatus. In FIG. 17, a reference numeral 66 denotes a memory change-over circuit, 67 to 69 are frame memories for three channels, respectively, and 70 is a memory selection control circuit which is so arranged as to divide the frame number data on the line 6 by "3" to thereby allow the memory change-over circuit 66 to select the frame memory 1, 2 or 3 (67, 68 or 69) when the division results in a remainder of "0", "1" or "2", respectively. A similar operation is performed also in the circuit shown in FIG. 18, in which a reference numeral 71 denotes a memory change-over circuit, 72 to 74 denote frame memories, respectively, and 75 denotes a memory selection control circuit. Parenthetically, the same parts as those shown in FIGS. 12 and 13 are denoted by like reference symbols.

Figure 19A:
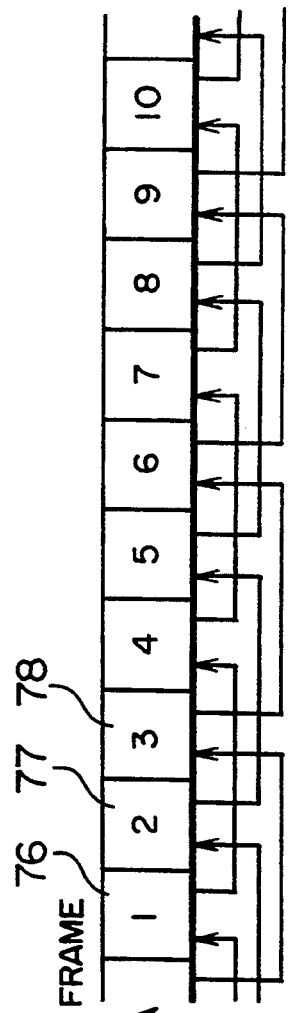
FIGS. 19A to 19C are diagrams for illustrating conceptually the recording and reproducing operations of the circuits shown in FIGS. 17 and 18.
Figure 19B:
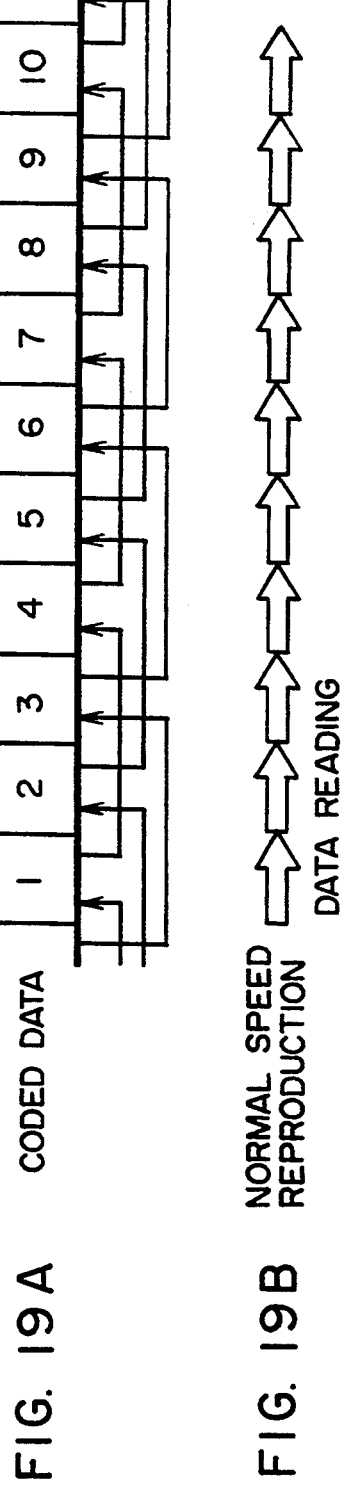
Figure 19C:

FIGS. 19A to 19C are views for illustrating a recording format for recording coded picture data and reproducing methods thereof. More specifically, FIG. 19A shows the disposition or array of the coded data recorded on the optical disc and FIGS. 19B and 19C are views for illustrating the method of reproducing the coded data. Basically, the coded data of the individual frames resulting from the inter-frame coding and the data compression are sequentially recorded in the order of the frame numbers. In conjunction with the instant embodiment, it should however be noted that the inter-frame coding is carried out by making use of the data of the third preceding frame rather than that of the immediately preceding frame. All the frames are sub-divided into frame rows each including separate frames, wherein the individual frames 76, 77 and 78 of each frame row are sequentially interleaved in multiplexing. This peculiar inter-frame coding method is referred to as interleave inter-frame coding. For reproduction at the normal speed, the recorded coded data of all the frames 76 to 78 is sequentially read out on a frame basis in the order of the frame numbers, as shown in FIG. 19B, whereon the data read out is decoded for every row including separate frames (i.e. on the frame-row basis). On the other hand, for reproduction at treble speed, the data only for every third frame 76 located at the same position in every frame row is sequentially read out and decoded. In this way, both the normal speed reproduction and the treble speed reproduction can selectively be realized.

Now, referring to FIG. 17, the picture data inputted to the picture data coding circuit over the line 1 is coded by the inter-frame coding circuit 3 to be outputted onto the line 8 as coded picture data. At that time, one of the three frame memories 67, 68 and 69 is selected by the memory change-over circuit 66. Since the three frame memories 67 to 69 are sequentially turned on under the command of the memory selection control signal on the line 104, the picture data of all the frames is coded independently on a frame-row basis, each row including separate frames, as described hereinbefore.

Referring to FIG. 18, the coded data inputted to the picture data decoding circuit from the line 40 is decoded by the inter-frame decoding circuit 42 to be outputted on the line 47 as the picture data. At that time, one of the three frame memories 72, 73 and 74 is selected by the memory change-over circuit 71. More specifically, when the reproduction mode data assumes the level "1" indicating normal reproduction, the switch circuit 184 assumes the position "0", whereby the three frame memories 72, 73 and 74 are sequentially changed over to one another in accordance with the memory change-over signals "0", "1" and "2" outputted sequentially by the memory selection control circuit 75. Thus, the coded data of each frame row including separate frames is decoded independently and separately from the data of other frame rows. Parenthetically, the memory change-over signal is generated from the frame number data 45 by the memory selection control circuit 75 and may be, for example, a data signal which assumes states varying around every third frame. When the input reproduction mode data is "1", indicating high speed reproduction, only the data stored in the frame memory 73 is selected by the memory change-over circuit 71 to be reproduced at high speed.

By virtue of the arrangement of the coded data recording/reproducing system described above, the third embodiment of the invention allows the recording to be performed for a much extended period with a higher compression ratio than the second embodiment described hereinbefore. Besides, both normal speed reproduction and high speed reproduction can selectively be performed.

Next, a fourth embodiment of the present invention will be described. This embodiment differs somewhat from the preceding embodiments in respect to the application. Referring to FIG. 20 which shows in a block diagram a dynamic picture recording apparatus according to the fourth embodiment, the moving picture recording apparatus shown in FIG. 20 is so designed as to encodes a plurality of input picture signals and compress the coded data in parallel, whereon the coded and compressed data is multiplexed processing by interleave under the control of a picture switch control circuit 93 to be subsequently recorded on an optical disc. The moving picture reproducing apparatus compatible with the above-mentioned recording apparatus is designed to select some of the plural moving pictures recorded on the optical disc through interleave multiplexing and implemented in a circuit configuration similar to that shown in FIG. 11, as will be seen in FIG. 21. More specifically, the optical disc reading unit 21 reads selectively one of the plural coded picture signals A, B, C or D shown in FIG. 20 in accordance with reproduced picture selecting signal "0", "1", "2" or "3". Now referring to FIG. 20, reference numerals 80 to 83 denote a plurality of (four in the instant embodiment) A/D conversion circuits, 84 to 87 denote frame memories each having a capacity corresponding to N frames, 88 to 91 denote picture data coding circuits, 92 denotes a multiplexer circuit, and 93 denotes the picture switch control circuit for allowing the coded picture data A, B, C and D to be sequentially transmitted on a frame basis. The parts which are similar to those shown in FIG. 10 are denoted by like reference symbols.

In operation, the picture signal A is converted to picture data by the A/D converter 80 to be subsequently written in the frame memory 84 having a memory capacity corresponding to N frames. The picture coding circuit 88 first encodes provisionally the picture data of N frames stored in the frame memory 84. At that time, the amount of the coded data is detected for determining the coding parameters (such as the number of quantizing bits and others) which are actually to be employed for containing the actual amount of the coded data within a predetermined capacity. Subsequently, with the aid of the coding parameters thus determined, the picture data of the oldest among N frames stored in the frame memory 84 is actually coded and outputted as the coded data. Although the time lag involved in the coding processing is increased, the quality of the moving picture can be enhanced due to the optimal control of the coding parameters performed by reading in precedence the data of the frame in the future. For the input picture signals B to D, the coded data is generated through a similar processing procedure. The coded data thus derived from the input picture signals A to D is supplied to the multiplexer circuits 93A to 93D, respectively, where the respective frame numbers are coded. The outputs of the multiplexer circuits 93A to 93D are then multiplexed in an interleaved manner by the data multiplex circuit 92 which changes over the coded data in accordance with the picture change-over signal 106 supplied from the picture switch control circuit 93. The coded data resulting from the interleave multiplexing of the four input picture signals A to D is first stored in the buffer memory 20 and then supplied to the optical disc recording unit 13 to be recorded on the optical disc 14. In the moving picture reproducing apparatus shown in FIG. 21, a given one of the four coded moving picture data multiplexed through interleaving is selected to be reproduced in accordance with a reproduced picture selecting signal. Due to the interleave-multiplexed recording, the change-over of the moving pictures is possible at any given time point.

FIGS. 22A, 22B and FIGS. 23A and 23B are views showing the format for recording the coded moving picture data on the optical disc shown in FIG. 20 and reproducing methods, respectively. In the case illustrated in FIGS. 22A and 22B, the intra-frame coding scheme is adopted as the picture data coding system, while in the case illustrated in FIGS. 23A and 23B, the inter-frame coding scheme is adopted, wherein FIGS. 22A and 23A show dispositions or arrays of the coded data with FIGS. 22B and 23B showing coded data reproducing methods, respectively. The frames 94 to 97 for the coded data of four moving picture signals A to D are sequentially multiplexed through interleaving on a frame basis. Thus, it is possible to read out selectively only the coded data of the moving picture to be reproduced. Although reproduction of the moving picture A is illustrated, it will readily be understood that the moving picture data to be reproduced can be changed over by displacing the reading position to the frame row from which the moving picture data is to be reproduced.

The embodiments of the invention described above can be combined with one another in various manners, which means that a variety of moving picture data recording/reproducing methods are available in practice. Although the foregoing description has been made on the assumption that the coded data is recorded on an optical disc, such as a CD-ROM disc and the like, it should be understood that the present invention is never restricted to such application, but other data recording media, such as, for example, a hard disk, a floppy disk and others, can equally be used without departing from the spirit and scope of the invention.

We claim:

1. A picture data recording/reproducing system including a recording apparatus and a reproducing apparatus, said recording apparatus comprising:
   input means for receiving digital picture data;
   coding means for inter-frame coding the digital picture data supplied from said input means to produce coded picture data, said coding means including a first frame memory for storing digital picture data of a previous frame;
   first clear means for substantially clearing the content of said first frame memory for every predetermined number of frames and for outputting cleared frame number data identifying the cleared frames;

multiplexing means for multiplexing the coded picture data supplied from said coding means with frame number data corresponding to said coded picture data supplied from said first clear means to produce multiplexed data; and recording means for recording the multiplexed data supplied from said multiplexing means on a recording medium; and said reproducing apparatus comprising:

means for reading out the recorded multiplexed data from said recording medium;

first decoding means for decoding said inter-frame coded picture data contained in the multiplexed data, said first decoding means including a second frame memory for storing decoded picture data of a previous frame;

second clear means for substantially clearing the content of said second frame memory for every frame designated by said frame number data;

second decoding means for decoding only the coded picture data contained in the multiplexed data for the frames designated by said frame number data;

selecting means for selecting one of two channels of data resulting from decoding of coded picture data by said first decoding means and second decoding means, respectively; and output means for outputting decoded picture data selected by said selecting means.

2. A picture data recording/reproducing system including a recording apparatus and a reproducing apparatus, said recording apparatus comprising:

input means for receiving digital picture data of plural frames;

coding means for coding the digital picture data received from said input means for all frames in accordance with an inter-frame coding scheme into coded picture data by making use of a previous frame of digital picture data, said coding means including a coder frame memory for storing digital picture data for said previous frame;

coder memory clear means for substantially clearing said coder frame memory in said coding means for every predetermined number of frames of picture data to cause said coding means to operate in an intra-frame coding scheme for coding those frames which are coded while the coder frame memory is cleared;

recording means for recording said coded picture data received from said coding means on a recording medium;

said reproducing apparatus comprising:

decoder selection control means for specifying one of two operations according to a selected picture producing mode;

reading-out means for reading out either said all coded picture data in a first operation or only intra-frame coded picture data contained in said coded picture data received from said recording medium for every predetermined number of frames in a second operation under control of said decoder selection control means;

decoding means for decoding said coded picture data received from said reading-out means in accordance with an inter-frame decoding scheme to produce reproduced picture data by making use of a previous frame of said reproduced picture data, said decoding means including a decoder frame memory for storing said reproduced picture data for said previous frame;

decoder memory clear means for substantially clearing said decoder frame memory in said decoding means while intra-frame coded picture data is decoded to cause said decoding means to operate in an intra-frame decoding scheme; and output means for outputting reproduced picture data received from said decoding means.

3. A picture data recording/reproducing system according to claim 2, wherein said recording apparatus further comprises frame number adding means for generating frame number data for every frame of the digital picture data and for adding the frame number data to every frame of said coded picture data, and said coder memory clear means includes means for operating on frames of the digital picture data to be intra-frame coded in said coding means for said every predetermined number of frames on the basis of the frame number data generated by said frame number adding means.

4. A picture data recording/reproducing system according to claim 3, wherein said reproducing apparatus further comprises frame number extracting means for extracting said frame number data from every frame of the read-out coded picture data, and wherein said reading-out means reads out the intra-frame coded picture data contained in the coded picture data during a second of said two operations of said decoder selection control means in accordance with the frame number data extracted by said frame number extracting means.

5. A picture data recording/reproducing system including a recording apparatus and a reproducing apparatus, said recording apparatus comprising:

input means for receiving digital picture data of plural frames in sequence;

coding means for coding the digital picture data for all frames to produce coded picture data in accordance with an interleave inter-frame coding scheme which codes each current frame of digital picture data using an inter-frame coding scheme together with a frame of digital picture data appearing earlier in said sequence by a predetermined frame series number of at least two frames where each frame of digital picture data belongs to a respective one of a plurality of picture frame series, each picture frame series including plural frames of digital picture data separated by said predetermined number of frames; and recording means for recording said coded picture data received from said coding means on a recording medium:

said reproducing apparatus comprising:

decoder selection control means for specifying one of two operations according to a selected picture producing mode;

reading-out means for reading out either all frames of coded picture data in a first operation or only periodic frames of said coded picture data which are separated by said predetermined frame series number of frames from said recording medium under control of said decoder selection control means in a second operation;

decoding means for producing reproduced picture data by decoding interleave inter-frame coded picture dam for each frame of coded picture data received from said reading-out means on a picture frame series basis in accordance with an interleave inter-frame decoding scheme by making use of a previous frame of the reproduced picture data in the same picture frame series as that to which the frame to be decoded belongs: and output means for outputting reproduced picture data received from said decoding means;

wherein said coding means includes coder frame memories in a number equal to that of said predetermined frame series number of frames, each coder frame memory storing digital picture data of a previous frame of each picture frame series, and coder memory switching means for selecting sequentially one of said coder frame memories corresponding to a picture frame series of digital picture data to be coded for every number of frames, in order to realize the interleave inter-frame coding of the digital picture data for each frame by changing over said coder frame memories using said coder memory switching means; and said decoding means includes decoder frame memories in a number equal to that of said predetermined frame series number of frames, each decoder frame memory storing said reproduced picture data of a previous frame of picture data in each picture frame series, and decoder memory switching means for selecting one of said decoder frame memories according to the picture frame series of each frame of the reproduced picture data, in order to realize interleave inter-frame decoding for each frame of the coded picture data by changing over said decoder frame memories using said decoder memory switching means.

6. A picture data recording/reproducing system according to claim 5, wherein said recording apparatus further comprises frame number adding means for generating frame number data for every frame of the digital picture data and for adding the frame number data to every frame of the coded picture data, and said coder memory switching means including means for sequentially selecting one of said coder frame memories in synchronism with the frame of digital picture data to be coded for every said predetermined frame series number of frames of digital picture data in accordance with the frame number data generated by said frame number adding means; and said reproducing apparatus further comprises frame number extracting means for extracting frame number data from every frame of read-out data, said decoder memory switching means including means for selecting one of said decoder frame memories according to the picture frame series of each frame of the reproduced picture data by the frame number data extracted by said frame number extracting means, and said decoder selection control means including means for selecting the frames to be read out by said reading-out means according to the frame number data extracted by said frame number extracting means and said selected picture reproducing mode.

7. A picture data recording/reproducing system including a recording apparatus and a reproducing apparatus, said recording apparatus comprising:

input means for receiving digital picture data;

coding means for inter-frame coding the digital picture data supplied from said input means to produce coded picture data, said coding means including a first frame memory for storing digital picture data of a previous frame;

first clear means for substantially clearing the content of said first frame memory for every predetermined number of frames and for outputting cleared frame number data identifying the cleared frames;

multiplexing means for multiplexing the coded picture data supplied from said coding means with said frame number data corresponding to said coded picture data supplied from said first clear means to produce multiplexed data; and recording means for recording the multiplexed data supplied from said multiplexing means on a recording medium; and said reproducing apparatus comprising:

means for reading out the recorded multiplexed data from said recording medium;

decoding means for decoding said inter-frame coded picture data contained in the multiplexed data, said decoding means including a second frame memory for storing decoded picture data of a previous frame;

second clear means for substantially clearing the content of said second frame memory for every frame designated by said frame number data;

output means for outputting decoded picture data decoded by said decoding means.

8. A picture data recording/reproducing system according to claim 2, wherein said recording apparatus further comprises additional data adding means for generating additional data indicative of a coding scheme for every frame of the digital picture data and for adding said additional data to every frame of said coded picture data, and said coder memory clear means includes means for operating on frames of the digital picture data to be intra-frame coded in said coding means for said every predetermined number of frames on the basis of said additional data generated by said additional data adding means.

9. A picture data recording/reproducing system according to claim 8, wherein said reproducing apparatus further comprises additional data extracting means for extracting said additional data from every frame of the read-out coded picture data, and wherein said reading-out means reads out the intra-frame coded picture data contained in the coded picture data during a second of said two operations of said decoder selection control means in accordance with the additional data extracted by said additional data extracting means.

10. A picture data recording/reproducing system according to claim 5, wherein said recording apparatus further comprises additional data adding means for generating additional data indicative of a predetermined frame series number for every frame of the digital picture data and for adding the additional data to every frame of the coded picture data, and said coder memory switching means including means for sequentially selecting one of said coder frame memories in synchronism with the frame of digital picture data to be coded for every said predetermined frame series number of frames of digital picture data in accordance with the additional data generated by said additional data adding means; and said reproducing apparatus further comprises additional data extracting means for extracting said additional data from every frame of read-out data, said decoder memory switching means including means for selecting one of said decoder frame memories according to the picture frame series of each frame of the reproduced picture data by said additional data extracted by said additional data extracting means, and said decoder selection control means including means for selecting the frames to be read out by said reading-out means according to said additional data extracted by said additional data extracting means and said selected picture reproducing mode.

* * * * *